United States Patent [19]

Kelyman

[11] 4,087,413

[45] May 2, 1978

[54] CROSSLINKED, LINEAR, ACYLATED POLYALKYLENEPOLYAMINES AND PROCESS THEREFOR

[75] Inventor: Jacqueline S. Kelyman, Midland, Mich.

[73] Assignee: The Dow Chemical Company, Midland, Mich.

[21] Appl. No.: 775,342

[22] Filed: Mar. 7, 1977

[51] Int. Cl.$^2$ ............................................. C08G 18/00
[52] U.S. Cl. ............................................. 260/77.5 CH
[58] Field of Search ................................. 260/77.5 CH

[56] References Cited

U.S. PATENT DOCUMENTS

| | | | |
|---|---|---|---|
| 3,418,275 | 12/1968 | Stephens | 260/77.5 CH |
| 3,418,287 | 12/1968 | Foster | 260/77.5 CH |
| 3,440,087 | 4/1969 | Kamal et al. | 260/77.5 CH |
| 3,471,450 | 10/1969 | Müllen | 260/77.5 CH |
| 3,655,814 | 4/1972 | Rembaum | 260/77.5 CH |
| 3,865,791 | 2/1975 | Brinkmann et al. | 260/77.5 CH |

*Primary Examiner*—M. J. Welsh
*Attorney, Agent, or Firm*—G. R. Plotecher

[57] ABSTRACT

The title compounds are prepared by contacting a linear, acylated polyalkylenepolyamine, such as poly(N-propionyl)ethylenimine, and a diisocyanate, such as toluene diisocyanate, at a temperature of about 30°–200° C. These novel, crosslinked polyalkylenepolyamines are useful water absorbants and bleach Kraft-pulp effluent decolorants.

23 Claims, No Drawings

CROSSLINKED, LINEAR, ACYLATED POLYALKYLENEPOLYAMINES AND PROCESS THEREFOR

BACKGROUND OF THE INVENTION

1. Field of the Invention

This invention relates to novel, crosslinked polyalkylenepolyamines and a process for their preparation.

2. Description of the Prior Art

Linear, acylated polyalkylenepolyamines are known to absorb large amounts of water and to interact with various colorants present in bleach Kraft-pulp effluents. However, these polymers are water-soluble and as such not readily adaptable to the aforementioned utilities. The only present art-recognized method for rendering these polymers water-insoluble is to graft same onto various resin beads ("Oxazoline and/or Oxazine-Modified Polymers" by Chamberlin et al., Ser. No. 639,152 and filed Dec. 9, 1975). This method is generally efficient for polymers having a relatively small number of repeating units, e.g., less than about 15, but is generally inefficient for polymers having a relatively large number of repeating units, e.g., more than about 20. Moreover, a larger ratio of amide to polymer weight or volume than that afforded by the grafted polymers is desirable for reasons of nitrogen functionality.

Weiner, *J. Org. Chem.*, 25, 2245 (1960) teaches the preparation of N,N-dimethyl-N'-phenylformamidine from the reaction of phenyl isocyanate and N,N-dimethyl-formamide. The teaching is silent as regards polymeric and polyisocyanate reactants.

SUMMARY OF THE INVENTION

According to this invention, linear, acylated polyalkylenepolyamines are rendered water-insoluble by contacting same with a diisocyanate at a temperature between about 30° and about 200° C. The resulting crosslinked, linear, acylated polyalkylenepolyamines consist essentially of $n$ randomly joined units of the formulae

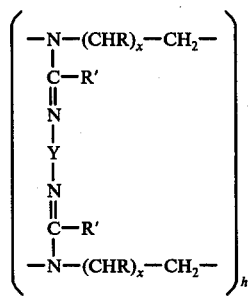
(I)

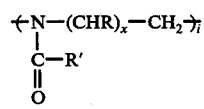
(II)

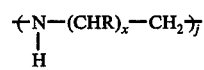
(III)

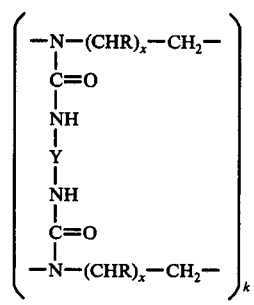
(IV)

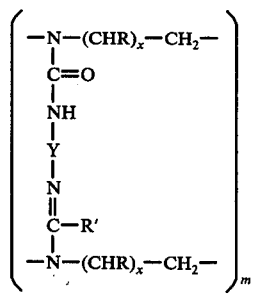
(V)

wherein

R is hydrogen or $C_1$–$C_3$ alkyl;

R' is hydrogen, phenyl, $C_1$–$C_{18}$ alkyl or an inertly-substituted phenyl or $C_1$–$C_{18}$ alkyl;

Y is arylene, $C_1$–$C_{10}$ alkylene, $C_5$–$C_7$ cycloalkylene or an inertly-substituted derivative thereof;

$x$ is 1 or 2;

$n$ is an integer of at least 4;

$i$ is an integer of at least 1; and $j$, $h$, $k$ and $m$ are independently integers of at least 0 with the provisos that (a) $h+k+m$ is between about 2 percent and about 80 percent of $n$, (b) $(i/2)+(j/2)$ is between about 20 percent and about 98 percent of $n$, and (c) $h+(i/2)+(j/2)+k+m = n$.

As earlier suggested, these polymers are useful water-absorbants and bleach Kraft-pulp effluent decolorants. Moreover, these polymers can be generated from either extruded, water-soluble polyalkylenepolyamines and from water-soluble polyalkylenepolyamines coated upon a substrate.

DETAILED DESCRIPTION OF THE INVENTION

Polyalkylenepolyamines are known compounds consisting essentially of $n$ units (VI, VII), randomly joined, and are readily prepared by the ring-opening polymerization of substituted oxazolines or like compounds (VIII), followed optionally by hydrolysis.

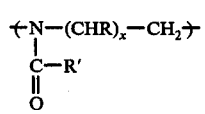
(VI)

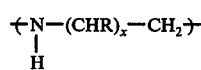
(VII)

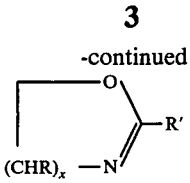

The substituents and subscripts are as hereinbefore defined. The ring-opening polymerization is generally conducted in the presence of a cationic polymerization catalyst at a reaction temperature of about 0°–200° C. Typical catalysts include strong mineral acids, organic sulfonic acids and their esters, acidic salts such as ammonium sulfate, Lewis acids such as aluminum trichloride, stannous tetrachloride, boron trifluoride, and organic diazoniumfluoroborates dialkylsulfates, and other like catalysts. This ring-opening polymerization is further described by Tomalia et al., *J. Polymer Science*, 4, 2253 (1966); Bassiri et al., *Polymer Letters*, 5, 871 (1967); and Seeliger, Ger. Pat. No. 1,206,585.

The pre-hydrolyzed polymers thereby obtained are linear, N-acylated polyalkylenepolyamines having a molecular structure consisting essentially of repeating units VI. These polymers are easily deacylated by acid, base or neutral hydrolysis. Hydrolysis (deacylation) is best controlled under acidic conditions and acid hydrolysis is thus preferred. The partially deacylated polyalkylenepolyamines have a molecular structure consisting essentially of the randomly joined units VI and VII, illustratively depicted as

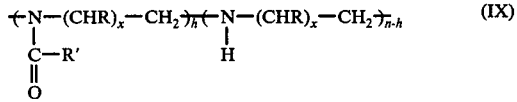

wherein
  $n$ is the total number of units;
  $h$ is the number of acylated units; and
  $n-h$ is the number of deacylated units.

"Acylated polyalkylenepolyamines" here includes both the fully and partially acylated polymers. Partially acylated polyalkylenepolyamines have at least one acyl group ($R'C=O$) per crosslinked polymer chain. Preferably, the polyalkylenepolyamines here used are at least about 50 percent acylated ($h$ is at least about 50 percent of $n$) and more preferably at least about 90 percent acylated ($h$ is at least about 90 percent of $n$). Fully acylated polyalkylenepolyamines ($h$ is or is about 100 percent of $n$) are most preferred.

The diisocyanates here used are of the formula

wherein
Y is arylene, $C_1$–$C_{10}$ alkylene, $C_5$–$C_7$ cycloalkylene or an inertly-substituted derivative thereof, i.e., an inertly-substituted arylene, alkylene, etc. The "-ene" in each of these substituents indicates, of course, that Y is a divalent radical. Convenience and economy prefer the arylenes and inertly-substituted arylenes with the latter especially preferred. By "inertly-substituted" is meant that the substituents, such as halogen, hydrocarbon, ethylenic unsaturation, etc., are inert to this invention's reagents and/or parameters. A non-limiting illustration includes the diisocyanates of phenylene, chlorophenylene, tolylene, xylylene, ethylene, propylene, butenylene, octylene, decylene, cyclohexylene, cycloheptylene, and the like.

Under suitable crosslinking conditions, the diisocyanates crosslink two polyalkylenepolyamines. The crosslinking occurs at either the amide and/or amine functions of the polyalkylenepolyamines and is by either amidine I, urea IV or combination V linkage. These linkages occur randomly and between various crosslinked polyalkylenepolyamine chains thus generating a polymer matrix.

The crosslinked, linear, acylated polyalkylenepolyamine consists essentially of $n$ randomly joined I, II, III, IV and V units. $n$ is an integer of at least about 4, and preferably of about 100. Practical limitations, such as convenience and utility, are the only ceiling upon the maximum size of $n$ but typically $n$ does not exceed about 10,000. $n$ is also the sum of the individual units comprising the crosslinked polyalkylenepolyamines ($n=h+(i/2)+(j/2)+k+m$). $h$, $k$ and $m$ represent the number of individual amidine, urea and combination crosslinked units, respectively. These subscripts are independently integers of at least 0 and generally do not exceed about 8,000. Since these polymers are at least about 2 percent crosslinked, $h+k+m$ is about 2 percent of $n$. Likewise, since these polymers are generally not crosslinked in excess of about 80 percent, and preferably of about 40 percent, $h+k+m$ generally does not exceed about 80 percent, and preferably about 40 percent, of $n$. Accordingly, these crosslinked polymers contain at least about 20 percent free nitrogen functionality (amide + amine), and preferably about 60 percent. Similarly, about 98 percent of these crosslinked polymers can be free nitrogen functionality. In terms of subscripts, $i$ is an integer of at least 1and generally not in excess of about 16,000. $j$ is an integer of at least 0 and also generally not in excess of about 16,000. Accordingly, the sum of $(i/2)+(j/2)$ is at least about 20 percent and preferably about 60 percent of $n$. Likewise, the sum generally does not exceed about 98 percent of $n$. Of course, it is necessary to divide both $i$ and $j$ by 2 as regards polymer size because these individual units are distributed over 2 polymer chains. Crosslinked polymers wherein $i/2$ is about 50 percent of the sum of $(i/2)+(j/2)$ are preferred with polymers wherein $i/2$ is about 90 percent of the sum of $(i/2)+(j/2)$ more preferred. Polymers wherein $i/2$ is about 100 percent of the sum of $(i/2)+(j/2)$ are most preferred. These preferences reflect an increasing percentage of free amide functionality in the crosslinked polymers at the expense of the free amine functionality and the most preferred polymers are, of course, generated from fully acylated polyalkylenepolyamines.

The preparation of these crosslinked polymers requires contacting the diisocyanate and polyalkylenepolyamine at a minimum equivalence ratio of about 0.02:1. The equivalence ratio generally does not exceed about 0.8:1 and preferably does not exceed about 0.4:1. While an equivalence ratio of 1:1 or greater can be employed to achieve total crosslinking, such polymers are disfavored and thus are such equivalence ratios.

The contacting is typically conducted at a temperature of at least about 30° C and preferably about 110° C. A maximum temperature of about 200° C, and preferably of about 170° C, is typically employed. At temperatures below about 30° C the crosslinking proceeds but at unsatisfactory rates and temperatures above about 200° C generate no additional benefit to reaction rate or product composition.

Pressure is not critical to the preparation of these crosslinked polymers except for its relation to temperature. Autogenuous pressures are preferred.

The preparations of this invention can be conducted either neat or in the presence of a suitable solvent. Any solvent wherein the reactants are miscible can be used, illustrative solvents including: Acetone, tetrahydrofuran, methylene chloride, chloroform, carbon tetrachloride, acetonitrile, etc. Convenience prefers neat process conditions.

The following examples are illustrative of certain specific embodiments of this invention. Unless otherwise noted, all parts and percentages are by weight.

SPECIFIC EMBODIMENTS

EXAMPLE 1

Fully acylated poly(N-propionyl)polyethylenimine (57 g) having a weight average molecular weight of about 114,000 (approximately 1,100 VI units) and toluene diisocyanate (9.8 g) were charged to a 500 ml resin reactor. The reactor contents were heated to and maintained at 130°–150° C for 30 minutes. A hard, brittle foam (58 g) was recovered at room temperature and analyzed at about 10 percent crosslinked.

EXAMPLE 2

The crosslinked polymer prepared in Example 1 was subjected to 24 hours of continuous water wash. Subsequent analysis revealed a water uptake in excess of 13 multiples of the polymer weight.

EXAMPLE 3

The crosslinked polymer of Example 2 was air-dried for 24 hours and then subsequently dried for an additional 24 hours in a vacuum oven at 110° C at 1 mm of mercury. One-half gram of polymer was then mixed with St. Regis Kraft-pulp extraction liquors (10 ml, pH 7.0) and allowed to stand for 7 days. The mixtures were then centrifuged and the supernatant was subjected to spectrometric analysis. The polymer extracted about 69.4 percent of the colorants present in the liquors.

EXAMPLE 4

One-half gram of the dried Example 2 polymer was added to a solution of water (20 ml) and one-half gram of same to a 1 percent aqueous sodium chloride solution (20 ml). The mixtures were agitated for about 1 hour, subjected to vacuum filtration and subsequently weighed. The polymer mixed with water weighed 3.5373 g and the polymer mixed with the aqueous sodium chloride weighed 3.5230 g, each showing an aqueous uptake in excess of seven multiples of the original polymer weight. Moreover, the presence of sodium chloride does not adversely effect the polymer's water absorbency.

While this invention has been described with specific reference to particular embodiments, it is understood that it is not to be limited thereto but is to be construed consistent with the specification and restricted solely by the scope of the appended claims.

What is claimed is:

1. A water-insoluble, crosslinked, linear, acylated polyalkylenepolyamine consisting essentially of $n$ randomly joined units of the formulae

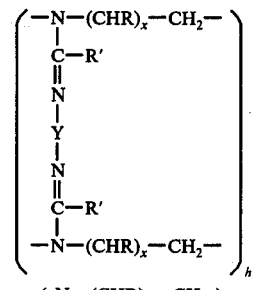   (A)

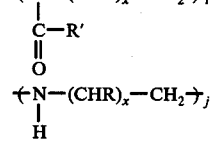   (B)

(C)

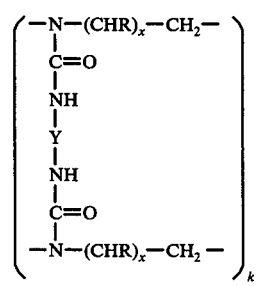   (D)

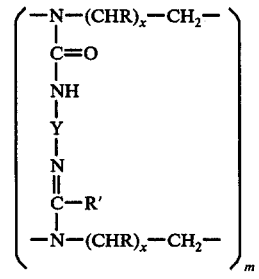   (E)

wherein
R is hydrogen or $C_1$–$C_3$ alkyl;.
R' is hydrogen, phenyl, $C_1$–$C_{18}$ alkyl or an inertly-substituted phenyl or $C_1$–$C_{18}$ alkyl;
Y is arylene, $C_1$–$C_{10}$ alkylene, $C_5$–$C_7$ cycloalkylene or an inertly-substituted derivative thereof;
$x$ is 1 or 2;
$n$ is an integer of at least 4;
$i$ is an integer of at least 1; and
$j$, $h$, $k$ and $m$ are independently integers of at least 0 with the provisos that
  (a) $h+k+m$ is between about 2 percent and about 80 percent of $n$,
  (b) $(i/2)+(j/2)$ is between about 20 percent and about 98 percent of $n$, and
  (c) $h+(i/2)+(j/2)+k+m = n$.

2. The polyalkylenepolyamine of claim 1 wherein
$n$ is an integer of at least 4 to about 10,000;
$i$ is an integer of at least 1 to about 16,000;
$j$ is an integer of at least 0 to about 16,000; and
$h$, $k$ and $m$ are independently integers of at least 0 to about 8,000.

3. The polyalkylenepolyamine of claim 2 wherein $n$ is at least about 100.

4. The polyalkylenepolyamine of claim 3 with the further proviso that $i/2$ is about 50 percent of $(i/2)+(j/2)$.

5. The polyalkylenepolyamine of claim 3 wherein $i/2$ is about 90 percent of $(i/2)+(j/2)$.

6. The polyalkylenepolyamine of claim 3 wherein $i/2$ is about 100 percent $(i/2)+(j/2)$.

7. The polyalkylenepolyamine of claim 6 wherein $x$ is 1.

8. The polyalkylenepolyamine of claim 7 wherein R is hydrogen.

9. The polyalkylenepolyamine of claim 8 wherein R' is $C_2$-$C_4$ alkyl.

10. The polyalkylenepolyamine of claim 9 wherein $h$ is between about 2 percent and about 40 percent of $n$.

11. The polyalkylenepolyamine of claim 10 wherein Y is arylene or inertly-substituted arylene.

12. The polyalkylenepolyamine of claim 11 wherein Y is tolylene.

13. A process for preparing the polyalkylenepolyamines of claim 1, the process comprising contacting (A) a linear, acylated polyalkylenepolyamine consisting essentially of $n$ randomly joined units of the formulae

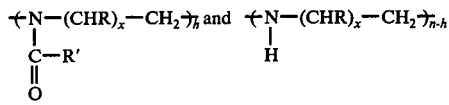

wherein
R is hydrogen or $C_1$-$C_3$ alkyl;
R' is hydrogen, phenyl, $C_1$-$C_{18}$ alkyl or an inertly-substituted phenyl or $C_1$-$C_{18}$ alkyl;
$x$ is 1 or 2;
$n$ is an integer of at least 4; and
$h$ is an integer of at least 1; with (B) a diisocyanate of the formula

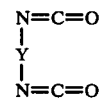

wherein Y is arylene, $C_1$-$C_{10}$ alkylene, $C_5$-$C_7$ cycloalkylene or an inertly-substituted derivative thereof at a diisocyanate:polyalkylenepolyamine equivalence ratio between about 0.02:1 and about 0.8:1, inclusive, and at a temperature between about 30° and about 200° C.

14. The process of claim 13 with the proviso that $h$ is at least about 50 percent of $n$.

15. The process of claim 13 wherein $h$ is at least about 90 percent of $n$.

16. The process of claim 13 wherein $h$ is or is about 100 percent of $n$.

17. The process of claim 16 wherein $x$ is 1.

18. The process of claim 17 wherein R is hydrogen.

19. The process of claim 18 wherein R' is $C_2$-$C_4$ alkyl.

20. The process of claim 19 wherein Y is arylene or inertly-substituted arylene.

21. The process of claim 19 wherein Y is tolylene.

22. The process of claim 21 wherein the equivalence ratio is between about 0.2:1 and about 0.4:1, inclusive.

23. The process of claim 22 wherein the temperature is between about 110° C and about 170° C, inclusive.

* * * * *